US010064031B2

(12) United States Patent
Schneider et al.

(10) Patent No.: US 10,064,031 B2
(45) Date of Patent: *Aug. 28, 2018

(54) METHOD AND APPARATUS FOR MIGRATING ACTIVE COMMUNICATION SESSION BETWEEN TERMINALS

(71) Applicant: AT&T Intellectual Property I, L.P., Atlanta, GA (US)

(72) Inventors: Marco Schneider, Austin, TX (US); Yi Zhang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,029

(22) Filed: Aug. 1, 2017

(65) Prior Publication Data

US 2017/0332219 A1 Nov. 16, 2017

Related U.S. Application Data

(63) Continuation of application No. 15/358,194, filed on Nov. 22, 2016, now Pat. No. 9,756,137, which is a
(Continued)

(51) Int. Cl.
*H04L 29/06* (2006.01)
*H04L 29/08* (2006.01)
(Continued)

(52) U.S. Cl.
CPC .......... *H04W 4/16* (2013.01); *H04L 65/1083* (2013.01); *H04L 67/148* (2013.01); *H04M 3/58* (2013.01);
(Continued)

(58) Field of Classification Search
CPC . H04L 65/1083; H04L 65/403; H04L 67/148; H04Q 2213/1327; H04M 3/58; H04W 4/16; H04W 68/00
See application file for complete search history.

(56) References Cited

U.S. PATENT DOCUMENTS 6,735,288 B1 * 5/2004 Geen ................. H04L 29/06027
370/352
6,847,632 B1 1/2005 Lee et al.
(Continued)

FOREIGN PATENT DOCUMENTS

WO 9859508 A1 12/1998
WO 9959353 A1 11/1999

OTHER PUBLICATIONS

Ohta, Ken et al., "Adaptive Terminal Middleware for Session Mobility", Multimedia Signal Processing, 2002 IEEE Workshop on Dec. 9-11, 2002, Piscataway, NJ, USA, IEEE, May 19, 2003, 394-399.

(Continued)

*Primary Examiner* — Wutchung Chu
*Assistant Examiner* — Kai Chang
(74) *Attorney, Agent, or Firm* — Guntin & Gust, PLC; Douglas Schnabel

(57) ABSTRACT

An apparatus and method are disclosed for migrating between terminals. An apparatus that incorporates teachings of the present disclosure may include, for example, a network proxy having a controller that manages a communications interface in a communication system. The controller can be programmed to receive a request to migrate a first terminal to a third terminal while active communications are taking place on a first voice channel connecting the first terminal to a second terminal, establish a second voice channel with the third terminal, connect the first and second voice channels, and terminate without action of an end user of the first terminal a connection between the first terminal and the first voice channel. Additional embodiments are disclosed.

20 Claims, 3 Drawing Sheets

Related U.S. Application Data continuation of application No. 11/420,181, filed on May 24, 2006, now Pat. No. 9,537,704.

(51) Int. Cl.
   *H04M 3/58* (2006.01)
   *H04W 4/16* (2009.01)
   *H04W 68/00* (2009.01)

(52) U.S. Cl.
   CPC ............ *H04W 68/00* (2013.01); *H04L 65/403* (2013.01); *H04Q 2213/1327* (2013.01)

(56) References Cited

U.S. PATENT DOCUMENTS

| | | | |
|---|---|---|---|
| 6,853,718 | B1 | 2/2005 | Bedingfield et al. |
| 6,914,900 | B1 * | 7/2005 | Komatsu ............ H04L 29/06027 370/356 |
| 6,914,964 | B1 * | 7/2005 | Levine .................... H04M 3/56 379/52 |
| 6,977,898 | B1 | 12/2005 | Miriyala et al. |
| 6,977,923 | B1 | 12/2005 | Hägebarth et al. |
| 7,006,618 | B1 | 2/2006 | Shaffer et al. |
| 7,023,979 | B1 | 4/2006 | Wu et al. |
| 7,065,199 | B1 | 6/2006 | Hyllander et al. |
| 7,088,816 | B2 | 8/2006 | Donnelly et al. |
| 7,106,848 | B1 | 9/2006 | Barlow et al. |
| 7,328,281 | B2 | 2/2008 | Takeda et al. |
| 7,403,744 | B2 | 7/2008 | Bridgelall |
| 7,729,489 | B2 | 6/2010 | Lee et al. |
| 7,817,606 | B2 | 10/2010 | Lin |
| 8,181,226 | B2 | 5/2012 | Lohr et al. |
| 2004/0205191 | A1 | 10/2004 | Smith et al. |
| 2005/0054335 | A1 | 3/2005 | Pearson et al. |
| 2005/0114646 | A1 | 5/2005 | Rekimoto et al. |
| 2005/0154774 | A1 | 7/2005 | Giaffreda et al. |
| 2005/0202810 | A1 | 9/2005 | LaPallo et al. |
| 2005/0253716 | A1 | 11/2005 | Hayashi et al. |
| 2005/0285740 | A1 | 12/2005 | Kubach et al. |
| 2006/0121891 | A1 | 6/2006 | Jagadeesan et al. |
| 2006/0153198 | A1 | 7/2006 | Chadha et al. |
| 2006/0294245 | A1 | 12/2006 | Raguparan et al. |
| 2007/0186002 | A1 | 8/2007 | Campbell et al. |
| 2007/0213037 | A1 | 9/2007 | Lukacs |
| 2007/0263828 | A1 | 11/2007 | Lee et al. |
| 2007/0269037 | A1 | 11/2007 | Gardiner et al. |
| 2009/0310495 | A1 | 12/2009 | Seta |
| 2017/0078407 | A1 | 3/2017 | Schneider |

OTHER PUBLICATIONS

Wang, et al., "A Signaling System Using Lightweight Call Sessions", Infocom 2000. 10th annual Joint Conference of the IEEE Computer and Communications Societies. Proceedings. IEEE Tel Aviv, Israel Mar. 26-30, 2000, Mar. 26, 2000, 697-706.

* cited by examiner

METHOD AND APPARATUS FOR MIGRATING ACTIVE COMMUNICATION SESSION BETWEEN TERMINALS

CROSS-REFERENCE TO RELATED APPLICATIONS

This application is a continuation of U.S. application Ser. No. 15/358,194, filed Nov. 22, 2016, which is a continuation of U.S. application Ser. No. 11/420,181, filed May 24, 2006, now U.S. Pat. No. 9,537,704, which are incorporated herein by reference in their entirety.

FIELD OF THE DISCLOSURE

The present disclosure relates generally to communication techniques, and more specifically to a method and apparatus for migrating between terminals.

BACKGROUND

Many consumers today have the choice of wired and wireless communication services. While in transit wireless communication services tends to be the preferred choice. While for those situated in a residence or commercial enterprise, wired communication services can be less expensive and generally offers better voice quality and/or data transmission throughput.

Transitioning between services during an active communication session can be awkward. For instance, in order for an end user to transition from a landline phone to a cell phone, the user needs to hang up the landline phone and originate a call on his cell phone with the same party. The same is true of the end user entering his residence while communicating on his cell phone and desiring to migrate to a landline phone.

A need therefore arises for a method and apparatus to migrate between terminals.

DETAILED DESCRIPTION OF THE DRAWINGS

Embodiments in accordance with the present disclosure provide a method and apparatus for migrating between terminals.

In a first embodiment of the present disclosure, a network proxy can have a controller that manages a communications interface in a communication system. The controller can be programmed to receive a request to migrate a first terminal to a third terminal while active communications are taking place on a first voice channel connecting the first terminal to a second terminal, establish a second voice channel with the third terminal, connect the first and second voice channels, and terminate without action of an end user of the first terminal a connection between the first terminal and the first voice channel.

In a second embodiment of the present disclosure, a computer-readable storage medium in a network proxy can have computer instructions for migrating a first terminal, engaged in active communications over a first voice channel with a second terminal, to a third terminal by connecting the third terminal to the first voice channel and automatically terminating a connection between the first terminal and the first voice channel.

In a third embodiment of the present disclosure, a computer-readable storage medium in a first terminal can have computer instructions for transmitting to a network proxy a request to migrate the first terminal, engaged in active communications over a first voice channel with a second terminal, to a third terminal by connecting the third terminal to the first voice channel and automatically terminating a connection between the first terminal and the first voice channel upon completing the connection with the third terminal.

Figure 1:
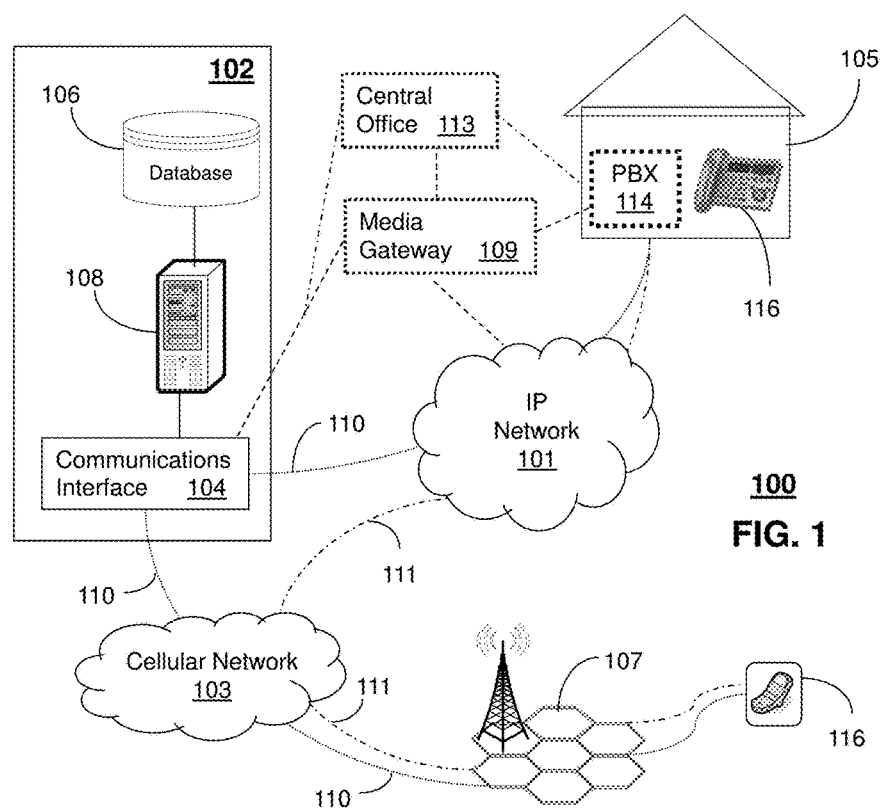
FIG. 1 depicts an exemplary embodiment of terminal devices communicating by way of wired and wireless access points (WAPs) with other terminal devices and/or a network proxy which collectively operate in a communication system.

FIG. 1 depicts an exemplary embodiment of terminal devices 116 communicating by way of wired and wireless access points (WAPs) with other terminal devices and/or a network proxy 102 which collectively operate in a communication system 100. The communication system 100 comprises an IP (Internet Protocol) network 101 coupled to the network proxy 102, a cellular network 103 and network elements located in a building 105 representing an enterprise or residence. The IP network 101 utilizes technology for transporting Internet traffic. For an enterprise setting, the building 105 can include a PBX 114 that provides voice and/or video connectivity services between terminal devices 116 of enterprise personnel such as a POTS (Plain Old Telephone Service) phone terminal, a Voice over IP (VoIP) phone terminal, or video phone terminal.

Similarly, in a residential setting, the building 105 can include POTS, VoIP or video terminal phone terminals coupled to a central office 113 utilizing conventional telephonic switches for processing calls with third parties. The network proxy 102 can be used to control operations of a media gateway 109, the central office 113 and the PBX 114. Communications between the network proxy 102, terminal devices 116 and other network elements of the communication system 100 can conform to any number of signaling protocols such as signaling system 7 (SS7), session initiation protocol (SIP), or H.323.

The network proxy 102 can comprise a communications interface 104 that utilizes common technology for communicating over an IP interface with the IP network 101, the media gateway 109, or the cellular network 103. By way of the communications interface 104, the network proxy 102 can direct by common means any of the foregoing network elements to establish circuit switched and/or packet switched connections between terminals 116 distributed throughout the communication system 100. The network proxy 102 further comprises a memory 106 (such as a high capacity storage medium) embodied in this illustration as a database, and a controller 108 that makes use of computing technology such as a desktop computer, or scalable server for controlling operations of the network proxy 102. The network proxy 102 can operate as an IP Multimedia Subsystem (IMS) conforming in part to protocols defined by standards bodies such as 3GPP (Third Generation Partnership Protocol).

Under the control of the network proxy 102, the media gateway 109 can link packet-switched and circuit-switched technologies such as the cellular network 103 (or central office 113) and the IP network 101, respectively. The media gateway 109 can conform to a proprietary media gateway control protocol (MGCP) or an open standard such as H.248 defined in the Internet Engineering Task Force (IETF). This protocol can handle signaling and session management needed during a multimedia conference. The protocol defines a means of communication between the media gateway 109, which converts data from the format required for a circuit-switched network to that required for a packet-switched network. MGCP can therefore be used to set up, maintain, and terminate calls between multiple disparate network elements of the communication system 100. The media gateway 109 to support hybrid communication environments such as VoIP to POTS and vice-versa.

The cellular network 103 can support voice and data services such as GSM-GPRS, EDGE, CDMA-1x, UMTS, and other known technologies. The cellular network 103 is coupled to base stations 107 under a frequency-reuse environment for communicating over-the-air with roaming terminal devices 116.

Figure 2:
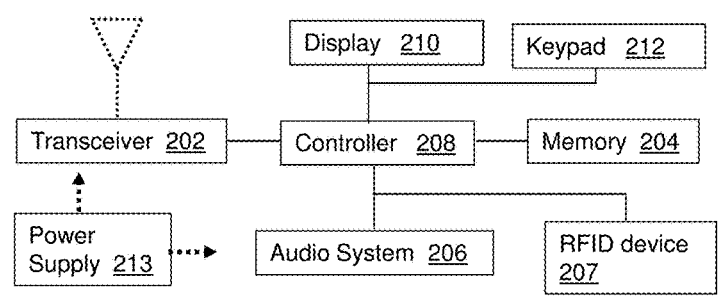
FIG. 2 depicts exemplary embodiments of the terminal device.

FIG. 2 depicts exemplary embodiments of the terminal device 116. In one embodiment, the terminal device 116 can be embodied in an immobile device (e.g., a wireline phone such as a POTS, VoIP or video terminal). In another embodiment, the terminal device 116 can include short range communications technology (e.g., a cordless phone, Bluetooth or WiFi) to support mobility within a small area such as the end user's residence. Alternatively, the terminal device 116 can represent a mobile terminal device utilizing a wireless transceiver 202 that supports long-range wireless communications such as supported by the cellular network 103. The wireless transceiver 202 of terminal device 116 utilizes technology for exchanging voice and data messages with the base stations 107, which in turn relays said messages to targeted end user terminals 116. In a multimode embodiment, the terminal device 116 can utilize a transceiver 202 that supports the aforementioned wireless and wireline access technologies (e.g., POTS, WiFi, Bluetooth™, cordless, and cellular).

Each of these embodiments of the terminal device 116 can further utilize a memory 204, an audio system 206, a radio frequency identification (RFID) device 207, and a controller 208. The memory 204 can comprise storage devices such as RAM, SRAM, DRAM, and/or Flash memories. The memory 204 can be an integral part of the controller 208. The audio system 206 can comprise a low volume speaker for listening to messages near the end user's ear and an associated microphone for exchanging messages with calling parties. The audio system 206 can further utilize a loud speaker for listening to announcements at a distance substantially away from the end user's ear, and as a speakerphone feature. The RFID device 207 can represent a passive or active RFID for short-range communications that serve the purpose of identifying the presence of another terminal having a similar device and conveying to said terminal its presence and identification.

The controller 208 can manage the foregoing components with computing technology such as a microprocessor and/or digital signal processor. The terminal devices 116 can further include a display 210 for conveying images to the end user, a keypad 212 for manipulating operations of the communication device, and a portable power supply 213. The audio system 206, display 210, and the keypad 212 can singly or in combination represent a user interface (UI) for interfacing with the end user.

Figure 3:
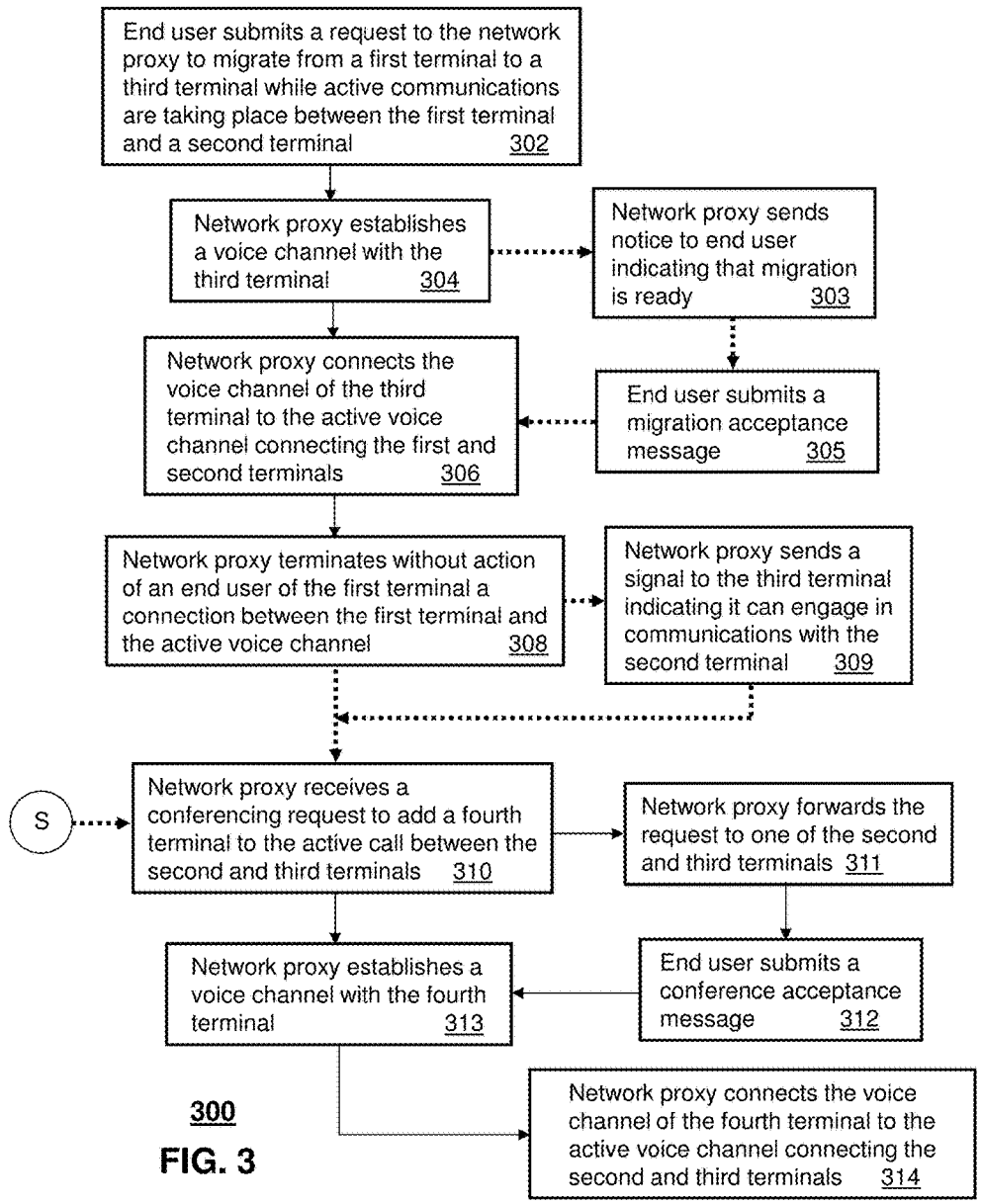
FIG. 3 depicts an exemplary method operating in portions of the communication system.

FIG. 3 depicts an exemplary method 300 operating in portions of the communication system 100. Method 300 begins with step 302 in which an end user submits a request to the network proxy 102 to migrate from a first terminal (e.g., a cell phone) to a third terminal (e.g., a landline phone) while active communications (e.g., a VoIP or circuit switch voice call) is taking place between the first terminal and second terminal. The request can be submitted to the network proxy 102 any number of ways.

For example, the end user can browse a website associated with the network proxy 102 by way of the first or third terminal 116 or some other computing device. At this website, the end user can request a migration between the aforementioned first and third terminals by selecting options in a UI presented by said website. In response to selecting a migration request, an Internet server supporting the website generates an Internet message corresponding to the request and transmits said message to the network proxy 102. Alternatively, the website can be integrally managed by the network proxy 102 in which case it can take direct action on the request without a message transmission step.

Alternatively, the end user can send the migration request to the network proxy 102 as an over-the-air message (e.g., a short message service (SMS) message) utilizing common functions of the first or third terminal 116. In yet another embodiment, the end user can depress one or more keys on the first or third terminal thereby submitting a sequence of Dual Tone Multi Frequency (DTMF) signals to the network proxy 102 which can represent the request (e.g., *8 to request a migration from cell phone to landline, or landline to cell phone depending on which terminal the network proxy 102 detects is submitting the request). The network proxy 102 can be programmed with any DTMF code to engage any number of desired migrations (cell phone to home, cell phone to office, cell phone to computer, home to cell phone, office to cell phone, computer to cell phone, and so on). In yet another embodiment, the end user of the first terminal 116 can interact with an interactive voice response system (IVR) managed or integrated into the network proxy 102 to specify by way of DTMF and/or voice signals a desired migration.

In yet another embodiment, the first and third terminals 116 can include a wireless transmitter in one terminal and a wireless receiver in the other (such as an RFID transmitter and RFID receiver) providing the terminal with the receiver a means to detect a presence of the other terminal. When such detection occurs, the receiving terminal 116 can automatically transmit the migration request to the network proxy 102 over a SS7, SIP or H.323 protocol. For example, in the case where the first terminal 116 is a cell phone, it can have a receiver to detect a signal transmitted by the third terminal (a landline).

In another embodiment, each of the first and third terminals 116 can include the RFID devices 207 mentioned earlier for mutual detection and identification. The first and third terminals 116 can decide amongst themselves which should send the migration request, or one of said terminals can be programmed to be the one that always submits said request. In yet another embodiment, the first or second terminal 116 can provide its end user a notice such as by way of a user interface (UI) presented at the display 210 informing said user of its detection of the other terminal. The UI can further include a prompt suggesting a migration between terminals by way of selection buttons (e.g., "Accept" or "Reject").

It would be evident to an artisan with ordinary skill in the art from the aforementioned examples that there innumerable embodiments for submitting a request to the network proxy 102.

Upon receiving the request from step 302, the network proxy 102 can be programmed in step 304 to direct one or more network elements (e.g., the media gateway 109, the central office 113, the PBX 114, the IP network 101, and/or the cellular network 103) of the communication system 100 to establish a voice channel with the third terminal. This step can represent the initiation of a network origination call to the third terminal 116 in which the end user hears a ringing alert at the third terminal prompting the end user to activate the terminal by removing it from its base or selecting a call acceptance button (e.g., a "Talk" button). Alternatively, if the request submitted to the network proxy 102 originated at the third terminal 116 by way of, for example, a DTMF signal (e.g. *8) initiated by the end user, the network proxy 102 can be programmed in step 304 to direct the communication system 100 to establish a voice channel with the third terminal without all the steps required in a network origination call.

In step 306, the network proxy 102 can be programmed to connect or bridge the voice channel of the third terminal 116 to the active voice channel connecting the first and second terminals 116. The network proxy 102 can be programmed in step 308 to contemporaneously terminate without action of the end user of the first terminal 116 a connection between the first terminal and the active voice channel resulting in a voice channel connection between the second and third terminals 116 only. At this point, the migration from the first terminal 116 to the third terminal without requiring either party to terminate the active voice channel and initiate a network origination call from the third terminal to the second terminal (or vice-versa) as is required by prior art systems today.

In an alternative embodiment, the network proxy 102 can be programmed in step 303 to send a notice to the end user requesting the migration at either the first or third terminal 116 indicating the migration step is ready to be executed. The end user can then decide to reject, or accept the migration by submitting a migration acceptance message by way of DTMF signals or an WR interaction in step 305. Once accepted, the network proxy 102 can proceed with steps 306-308 as previously described. In another embodiment, the network proxy 102 can be programmed in step 309 to transmit a completion signal to the third terminal 116 indicating to an end user of said terminal that s/he can engage in communications with the second terminal. The completion signal can be an audible signal such as a double beep conveyed by the audio system 206, a text signal presentable on the display 210, or some other form of notification technique suitable to the present disclosure. Without step 309, the end user of the third terminal 116 can assume this transition has occurred by attempting communications with the end user of the second terminal 116 and detecting a response.

In yet another embodiment, the network proxy 102 can be programmed in step 310 to receive a conferencing request from one of the end users of the second or third terminal 116, or from a third party requesting by way of a fourth terminal to be added to the active call between the second and third terminals. Alternatively, the third party's request can be directed in step 311 to one among the end users of the second or third terminal 116 by way of a call waiting function. The targeted end user can in turn reject or accept the call for conferencing purposes. If accepted, the terminal 116 of the targeted end user can be programmed in step 312 to submit the request to network proxy 102 to add the fourth terminal to the active call.

Step 310 accordingly does not represent a request for migration, but rather a request to conference third parties. Upon receiving the conferencing request, the network proxy 102 in steps 313-314 directs the communication system 100 to establish a voice channel with the fourth terminal and connects said voice channel to the active channel between the second and third terminals. Like in step 304, step 313 can represent a network origination call to the fourth terminal or a voice channel connection to the fourth terminal if it is actively engaged by the end user of said terminal.

It would be apparent to an artisan with ordinary skill in the art that the aforementioned embodiments can be modified, reduced, or enhanced without departing from the scope and spirit of the claims described below. For example, method 300 can be modified to perform migration and third party conferencing functions described above for data communications without a voice function. The symbol (S) connecting to step 310 can denote an embodiment in which steps 310-312 can be performed by the network proxy 102 and terminal devices 116 independent of the migration steps 302-308, thereby providing a means for inclusion of third parties for conferencing purposes. These are but a few examples of modifications that can be applied to the present disclosure. The reader is therefore directed to the claims below for a fuller understanding of the breadth and scope of the present disclosure.

Figure 4:
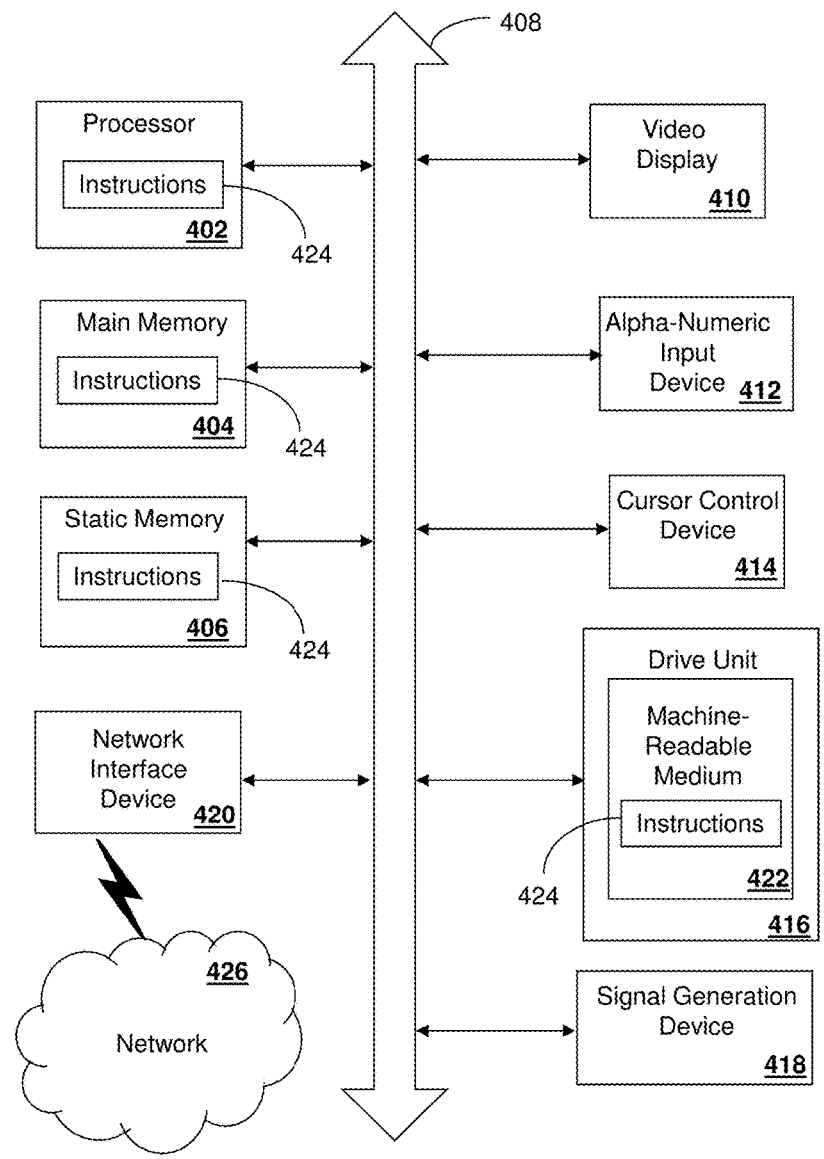
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and/or magneto-optical or optical medium such as a disk or tape. Accordingly, the disclosure is considered to include any one or more of a machine-readable medium as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 47 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a processing system including a processor, a request transmitted from a first end user device to migrate active communications with a second end user device from the first end user device to a third end user device while the active communications are taking place on a first channel connecting the first end user device to the second end user device;
   initiating, by the processing system, a network origination call to the third end user device via a second channel responsive to the receiving of the request;
   facilitating, by the processing system, a connection of the first channel and the second channel by way of a communications bridge;

contemporaneous with a detection at the third end user device of an acceptance of the network origination call, automatically terminating, by the processing system, a connection between the first end user device and the first channel, thereby releasing the first channel connecting the first end user device and the second end user device; and transmitting, by the processing system, a notification to the third end user device indicating that the third end user device can engage in communications with the second end user device.

2. The method of claim 1, wherein the first channel connecting the first end user device to the second end user device comprises a voice channel.

3. The method of claim 1, wherein the request is transmitted automatically by the first end user device responsive to detection of the third end user device.

4. The method of claim 1, wherein the request includes an identifier of the third end user device.

5. The method of claim 1, wherein the first end user device obtains an identifier of the third end user device via short-range communications via a radio frequency identification device.

6. The method of claim 1, wherein the communications between the second end user device and the third end user device are engaged in via the second channel.

7. The method of claim 6, wherein the second channel connecting the second end user device to the third end user device comprises a second voice channel.

8. The method of claim 1, further comprising:
receiving, by the processing system, a conferencing request transmitted from a fourth end user device to connect the fourth end user device to the second channel; and
establishing, by the processing system, a third channel with the fourth end user device.

9. The method of claim 8, further comprising facilitating, by the processing system, a connection of the second channel and the third channel, wherein the connection of the second channel and the third channel is performed while active communications are taking place on the second channel.

10. The method of claim 8, wherein the conferencing request conforms to a protocol comprising signaling system 7, session initiation protocol, H.323, or any combination thereof.

11. The method of claim 1, further comprising transmitting, by a processing system, a signal to the third end user device indicating that the third end user device can engage in communications with the second end user device.

12. The method of claim 11, wherein the signal comprises an audible signal, a text signal, or any combination thereof.

13. The method of claim 1, further comprising providing, by the processing system, a notice to a user of the first channel regarding detection of one of the first end user device by the third end user device or the third end user device by the first end user device.

14. A machine-readable storage medium comprising executable instructions that, when executed by a processing system including a processor, facilitate performance of operations, comprising:
receiving a request transmitted from a first end user device to migrate active communications with a second end user device from the first end user device to a third end user device while the active communications are taking place on a first channel connecting the first end user device to the second end user device;
initiating a network origination call to the third end user device via a second channel responsive to the receiving of the request;
facilitating a connection of the first channel and the second channel by way of a communications bridge;
terminating a connection between the first end user device and the first channel, thereby releasing the first channel connecting the first end user device and the second end user device; and
transmitting a notification to the third end user device indicating that the third end user device can engage in communications with the second end user device.

15. The machine-readable storage medium of claim 14, wherein the connection between the first end user device and the first channel is automatically terminated contemporaneous with a detection at the third end user device of an acceptance of the network origination call.

16. The machine-readable storage medium of claim 14, wherein the operations further comprise providing a notice to a user of the first channel regarding detection of one of the first end user device by the third end user device or the third end user device by the first end user device.

17. The machine-readable storage medium of claim 14, wherein the operations further comprise:
receiving a conferencing request transmitted from a fourth end user device to connect the fourth end user device to the second channel;
establishing a third channel with the fourth end user device; and
facilitating a connection of the second channel and the third channel, wherein the connection of the second channel and the third channel is performed while active communications are taking place on the second channel.

18. The machine-readable storage medium of claim 14, wherein the first channel connecting the first end user device to the second end user device comprises a first voice channel, and wherein the second channel connecting the second end user device to the third end user device comprises a second voice channel.

19. A device, comprising:
a processing system including a processor; and
a memory that stores executable instructions that, when executed by the processing system, facilitate performance of operations, comprising:
receiving a request transmitted from a first end user device to migrate active communications, at a first channel, with a second end user device from the first end user device to a third end user device;
initiating a network origination call to the third end user device via a second channel responsive to the receiving of the request;
facilitating a connection of the first channel and the second channel by way of a communications bridge;
terminating a connection between the first end user device and the first channel, thereby releasing the first channel connecting the first end user device and the second end user device; and
transmitting a notification to the third end user device indicating that the third end user device can engage in communications with the second end user device.

20. The device of claim 19, wherein the request is received from the first end user device while the active communications are taking place on the first channel connecting the first end user device to the second end user device.

* * * * *